US010628967B2

(12) United States Patent
Briggs (10) Patent No.: US 10,628,967 B2
(45) Date of Patent: Apr. 21, 2020

(54) CALIBRATION FOR MULTI-CAMERA SYSTEMS

(71) Applicant: Facebook, Inc., Menlo Park, CA (US)

(72) Inventor: Forrest Samuel Briggs, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 118 days.

(21) Appl. No.: 15/850,530

(22) Filed: Dec. 21, 2017

(65) Prior Publication Data

US 2019/0197734 A1    Jun. 27, 2019

(51) Int. Cl.
*G06T 7/80* (2017.01)
*H04N 5/232* (2006.01)
*G06T 3/40* (2006.01)
*G06T 5/00* (2006.01)

(52) U.S. Cl.
CPC ............. *G06T 7/85* (2017.01); *G06T 3/4038* (2013.01); *G06T 5/006* (2013.01); *H04N 5/23238* (2013.01); *G06T 2207/10012* (2013.01)

(58) Field of Classification Search
CPC ....... G06T 3/4038; G06T 7/00; G06T 19/006; H04N 5/23238
See application file for complete search history.

(56) References Cited

U.S. PATENT DOCUMENTS 9,911,454 B2 * 3/2018 van Hoff ............... G11B 19/20
10,186,301 B1 * 1/2019 van Hoff ............... G11B 27/34
2009/0022393 A1 * 1/2009 Bar-Zohar ............. G06T 7/593
382/154
2012/0169842 A1 * 7/2012 Chuang ............ G08B 13/19619
348/39
2016/0086379 A1 * 3/2016 Sadi ........................ G06F 3/167
345/633
2016/0088287 A1 * 3/2016 Sadi ..................... H04N 13/254
2019/0197734 A1 * 6/2019 Briggs ..................... G06T 7/85

OTHER PUBLICATIONS

NPL Google Search; 2019; (Year: 2019).*
Characterization of errors in compositing panorama images; Kang; 1996; (Year: 1996).*
Virtual view generation of 3D digital video; Moezzi; 1997; (Year: 1997).*
Camera calibration and applications; Karam; 2014; (Year: 2014).*

* cited by examiner

*Primary Examiner* — Luis Perez-Fuentes
(74) *Attorney, Agent, or Firm* — Fenwick & West LLP (57) ABSTRACT

An image processing system calibrates multiple cameras of a camera rig system. The image processing system may correct barrel distortion of raw images to generate rectilinear images. The image processing system identifies key points in neighboring rectilinear image pairs captured by adjacent cameras. The image processing system may generate a parameter vector by solving an optimization problem using a gradient descent loop and the key points. The optimization problem reduces a displacement error to align the key points of the rectilinear images by adjusting calibration of the cameras or a transform of the images (which corresponds to camera calibration). The image processing system may jointly rectify, i.e., calibrate, multiple cameras simultaneously.

18 Claims, 8 Drawing Sheets

CALIBRATION FOR MULTI-CAMERA SYSTEMS

BACKGROUND

This disclosure relates generally to calibrating a multi-camera system, and more specifically to calibrating camera orientation with images captured by the multi-camera system.

Virtual reality (VR) systems capture images using a multiple cameras to render 3-dimensional (3D) images or videos to present to users. However, images of a scene taken by different cameras may not be aligned due to factors such as barrel distortion, camera misalignment, or other variations in camera hardware and deviations in manufacture from the design of the multi-camera system. Effective calibration is thus essential for effectively combining images from the various cameras, for example to generate a panoramic view. Imperfections in a panoramic view degrade an immersive VR user experience. Thus, there is a need for calibrating cameras in a multi-camera system.

SUMMARY

An image processing system calibrates a multi-camera system by aligning key points in images captured by cameras of the system. In one embodiment, a set of images each captured by a different camera is received. A set of image pairs is identified, where each image pair includes images captured by adjacent cameras. For each image pair, a set of key points included in both images of the image pair is identified. The multi-camera system is calibrated by adjusting at least one transformation of the set of images to reduce a displacement error of the identified sets of key points. By combining images captured by a calibrated system, the image processing system may generate a canvas view. The image processing system may jointly rectify, i.e., calibrate, multiple cameras simultaneously to align key points in a vertical dimension between neighboring image pairs by solving an optimization problem.

In some embodiments, the image processing system generates a set of rectilinear images from the corresponding set of raw images and may correct barrel distortion. The image processing system identifies a set of key points for each rectilinear image. To solve the optimization problem, the image processing system may use a gradient descent loop to generate parameter vectors. A parameter vector contains information about, e.g., positions of the four corners of each rectilinear image, and is used to jointly rectify circumferentially arranged cameras of the multi-camera system. An optimized parameter vector may be obtained when total displacement error of the matching key points in an equirectangular projection is minimized. The positions of the images may be used to determine calibration parameters.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
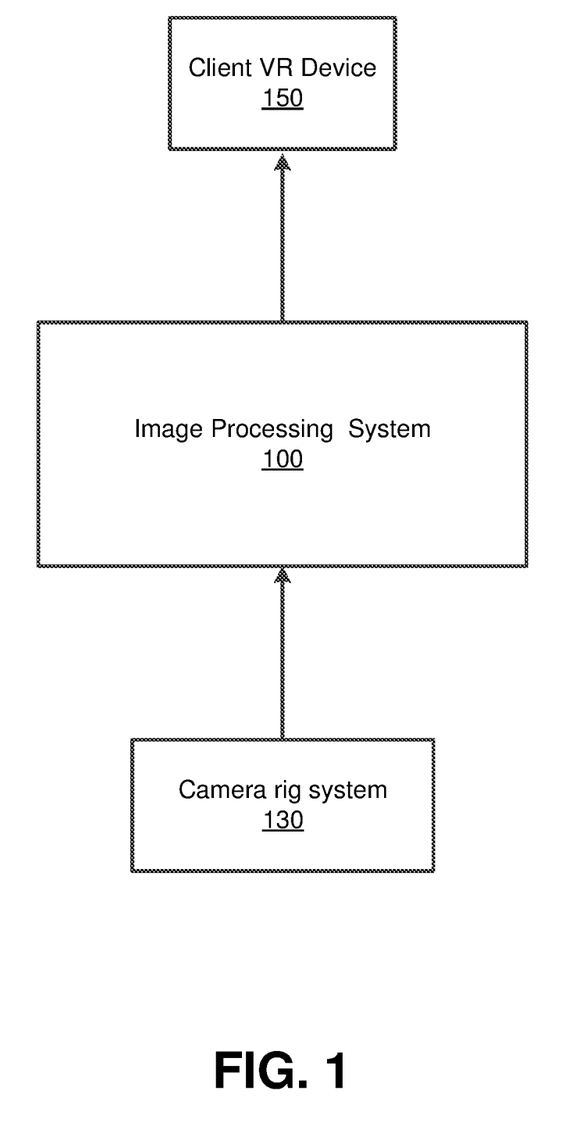
FIG. 1 is a block diagram of a system environment in which an image processing system operates, according to one embodiment.

FIG. 1 is a block diagram of a system environment in which an image processing system 100 operates, according to one embodiment. The system environment shown in FIG. 1 includes a camera rig system 130, an image processing system 100, and a client virtual reality (VR) device 150. In some embodiments, the system environment may include multiple camera rig systems 130, image processing systems 100, client VR devices 150, or additional components. Likewise, the functions performed by various entities in the system environment may differ in different embodiments.

The camera rig system 130 is a multi-camera system designed to capture images or videos (e.g., media) of a local area or a local scene. The local area or local scene is the environment in the vicinity of the camera rig system 130, e.g., a room in which the camera rig system 130 is positioned. The images captured by the camera rig system 130 provide multiple views of a scene or an object and may be used to create a canvas view of a scene for presentation by a client VR device 150. A canvas view can be any panoramic, spherical panoramic, or suitable wide angle view of a scene generated by combining multiple views from multiple cameras of the camera rig system 130. For example, a canvas view can be a 360-180 degree image, i.e., a 360-degree scene from a horizontal view and 180-degree scene from a vertical view. In some embodiments, the camera rig system 130 captures images to simulate the light field that would enter eyes of a user standing in the vicinity or origin point of the camera rig system 130.

As more fully described below, the image processing system 100 receives images captured by the camera rig system 130 and processes the images to generate an equirectangular projection. More specifically, the image processing system 100 may correct barrel distortion of the raw images to generate rectilinear images. The image processing system 100 identifies key points associated with key point descriptors in the images, and matches the identified key points in neighboring image pairs. A key point, as used herein, refers to a point in an image that is representative of a local area in the image and that is suitable for matching neighboring image pairs. A key point descriptor associated with the key point describes one or more features of the key point and helps distinguish the key point from surrounding pixels of the image. Further, the image processing system 100 may use key point descriptors to match or distinguish key points from different images (e.g., by identifying features in common). A neighboring image pair refers to a pair of images that are captured by two adjacent peripheral cameras in the camera rig system 130, and a neighboring image pair shares overlapped content (e.g., overlapped portion of the local scene captured by the camera rig system 130), as more fully described below. A neighboring image pair may include raw images with barrel distortion captured by two adjacent cameras, and may also be rectilinear images generated using the raw images. In some embodiments, the image processing system 100 solves an optimization problem to determine a parameter vector, which may be used to apply perspective transforms for simultaneous rectification (e.g., calibration) of the peripheral cameras of the camera rig system 130. The image processing system 100 may use images of the calibrated system to generate a canvas view with using calibration from the aligned key points, and the canvas view for captured images may be used to generate content for the client VR device 150.

The client VR device 150 presents media to a user and may be a head-mounted display (HMD) or another type of display device. More specifically, the client VR device 150 receives media captured by the camera rig system 130, and presents virtual scenes to the user wearing the client VR device 150. For example, the client VR device 150 presents a stereoscopic 3D scene generated using views created with captured images from the camera rig system 130.

Figure 2A:
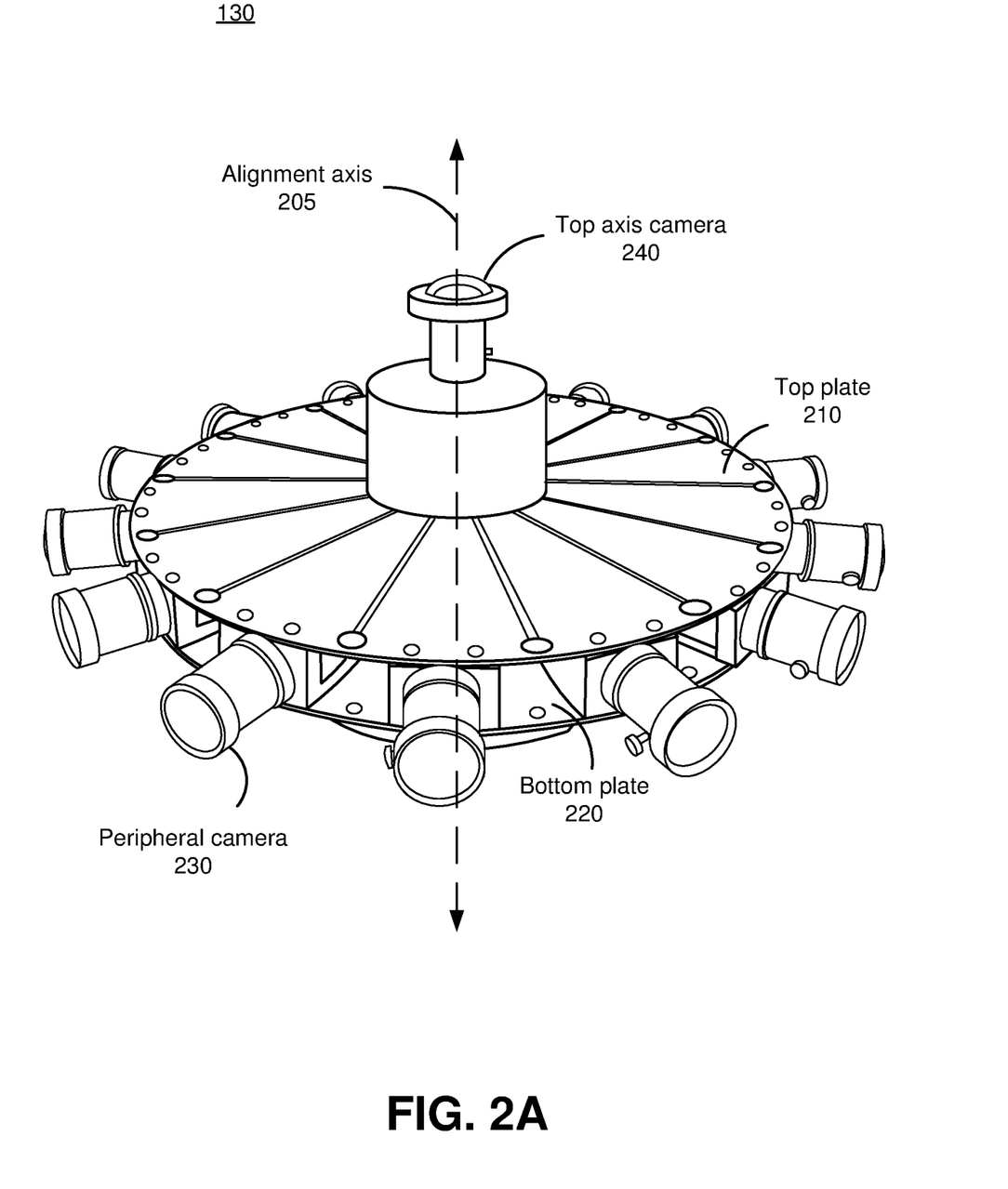
FIG. 2A is a perspective view of a camera rig system, according to one embodiment.
Figure 2B:
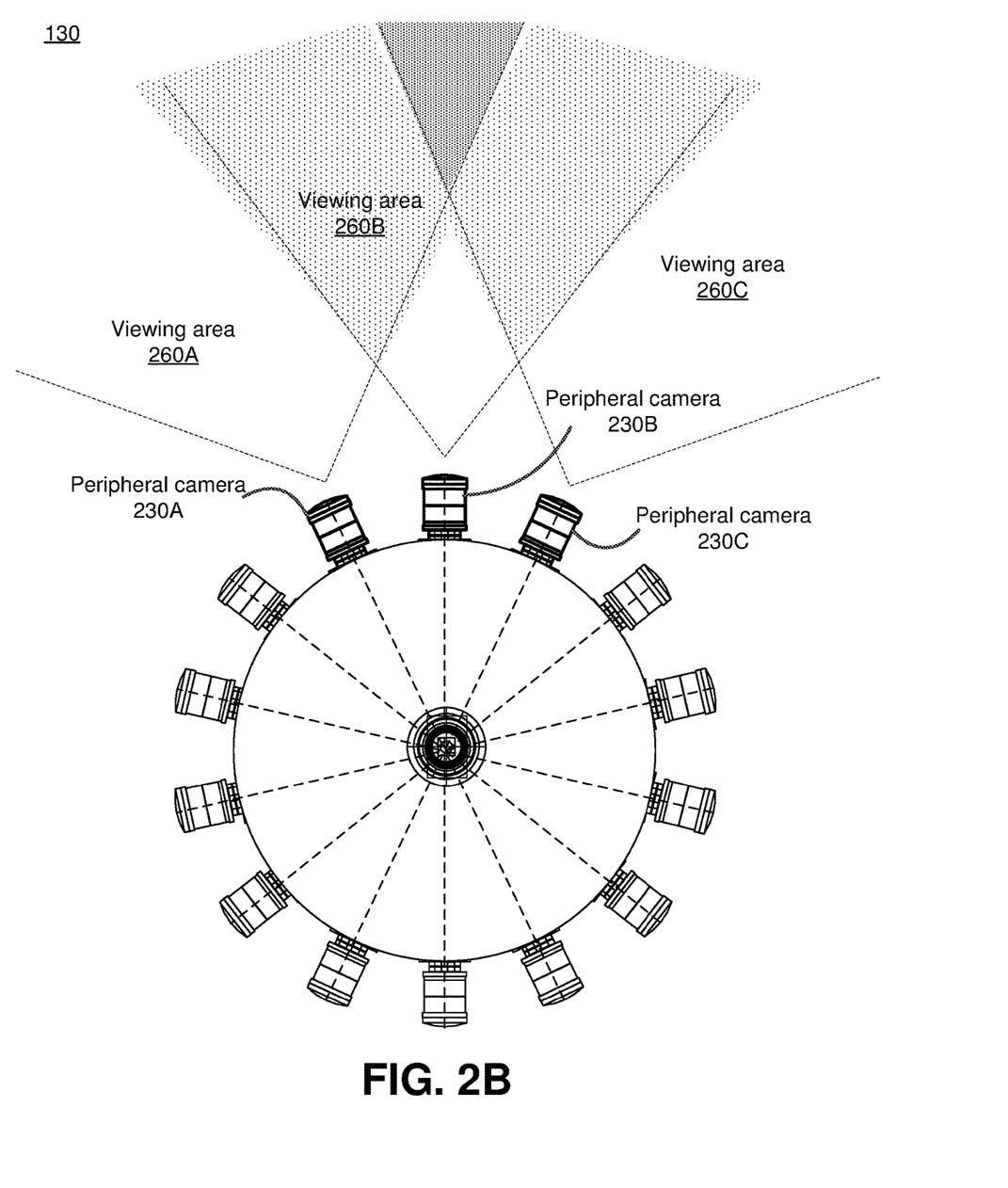
FIG. 2B is a top view of the camera rig system shown in FIG. 2A, according to one embodiment.

FIGS. 2A-2B show different views of the camera rig system 130, according to one embodiment. In particular, FIG. 2A is a perspective view of the camera rig system 130, according to one embodiment. As shown in FIG. 2A, the camera rig system 130 includes a top plate 210, a bottom plate 220, multiple peripheral cameras 230, and a top axis camera 240. The peripheral cameras 230 are arranged around the circumference of a ring around a central point of the top and bottom plates 210 and 220 that is bisected by an alignment axis 205. The top plate 210 and bottom plate 220 are coupled to a top and bottom surface of the peripheral cameras 230, respectively. The peripheral cameras 230 may be positioned such that an optical axis of each peripheral camera is parallel (or approximately parallel) to the same plane and a field of view of each peripheral camera faces away from the central point. Images captured by two adjacent peripheral cameras 230 of the camera rig system 130 are referred as a neighboring image pair.

In some embodiments, the camera rig system 130 may include multiple axis cameras, i.e., cameras longitudinally aligned to the alignment axis 205. For instance, in addition to the top axis camera 240, the camera rig system 130 includes a bottom axis camera (not shown in FIG. 2A) coupled to the bottom plate 220, to capture both a top view and a bottom view of a local area or a scene. The optical axis of each axis camera may be collinear with the alignment axis 205. This configuration creates a rigid structure that reduces or eliminates vibration of the peripheral cameras 230 and allows the peripheral cameras 230 to capture high-quality media for generating canvas views.

Further, the axis cameras may be vertically offset relative to the peripheral cameras 230 to limit the overlap between the fields of view. The top axis camera 240 and the bottom axis camera may include a fish-eye lens to capture a wide field of view, for example, a 180 degree hemisphere field of view.

FIG. 2B is a top view of the camera rig system 130 shown in FIG. 2A, according to one embodiment. In FIG. 2B, peripheral cameras 230A, 230B, and 230C and the corresponding viewing areas 260A, 260B, and 260C, respectively, are highlighted for purpose of illustration. Each viewing area 260 illustrates the field of view of a corresponding peripheral camera 230.

In one embodiment, the peripheral cameras 230 are positioned and oriented such that one or more pairs of adjacent peripheral cameras have overlapping fields of view, which are represented by the shadow regions in FIG. 2B. The peripheral cameras 230 may be positioned and oriented such that any object in the local area is within the field of view of at least two peripheral cameras 230.

Figure 3A:
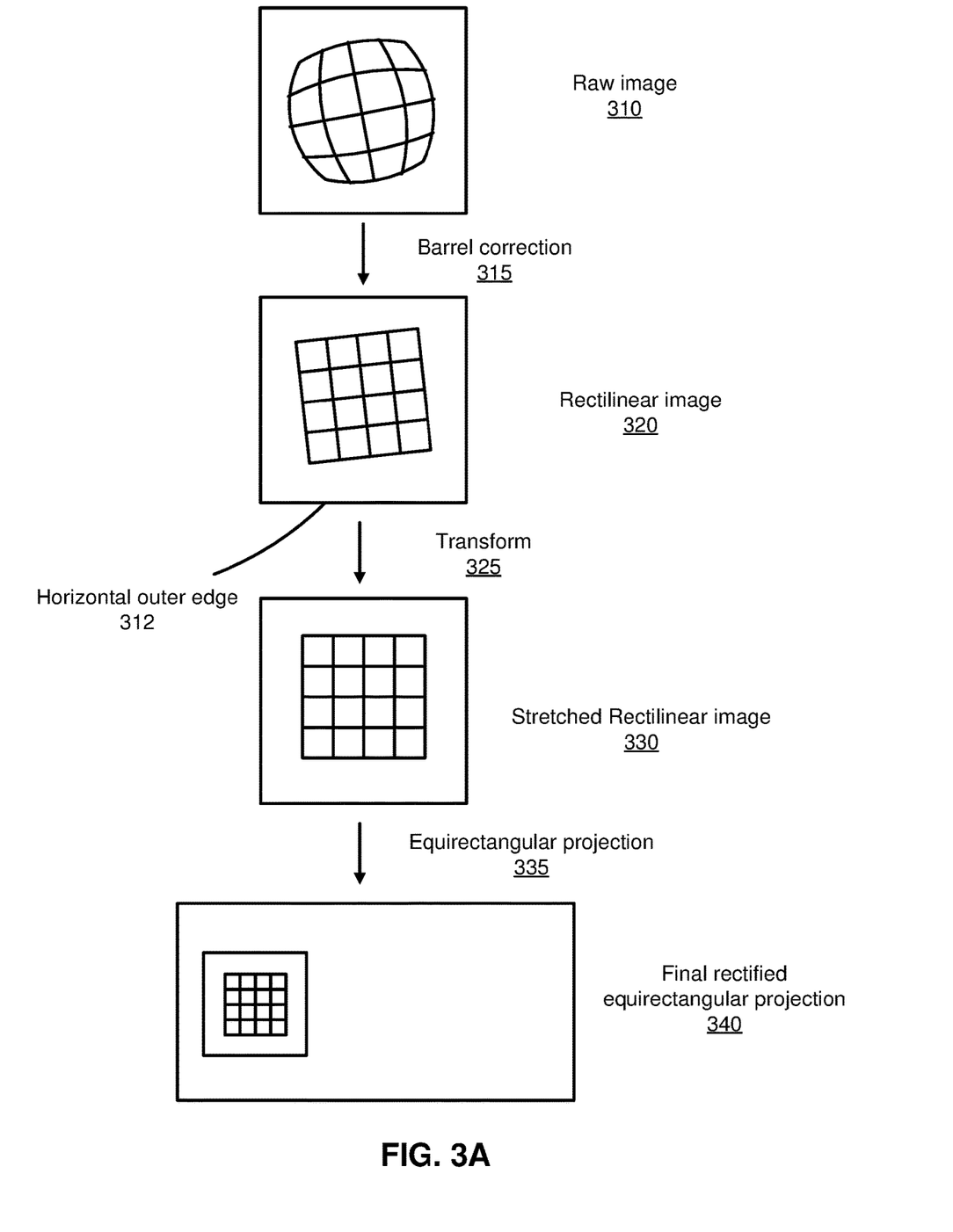
FIG. 3A shows line diagrams of an example process of mapping a raw image captured by the camera rig system to an equirectangular projection, according to one embodiment.

FIG. 3A shows line diagrams of an example process of mapping a raw image 310 captured by the camera rig system 130 to an equirectangular projection 340, according to one embodiment. As an example use case, the camera rig system 130 captures the raw image 310 of a typical 4-by-4 checkerboard. A checkboard is used here as an example, although other images and environments may be used in calibration of a camera rig system 130. Typically, raw images captured from a camera have distortions due to lens or other manufacturing characteristics of the imaging device capturing the image. Thus, the raw image 310 has barrel distortion, or in other words, the lines of the checkerboard are curved outward in a shape of a barrel, rather than being straight and orthogonal. The image processing system 100 performs barrel correction 315 to correct the barrel distortion and generate a rectilinear image 320 with straight and orthogonal lines of the checkerboard (in this example). However, other manufacturing discrepancies between the cameras in the camera rig system 130 may mean that the images after correcting for barrel distortions are not aligned with one another. In this example, although the horizontal checkerboard lines may be parallel to the ground in the environment that captured the image, the lines captured in the rectilinear image 320 are not parallel and before calibration the image may not be suitable for use with other camera images to generate a panoramic view.

To correct the captured image which includes the skewed horizontal checkerboard lines, the image processing system 100 warps the rectilinear image 320 with an image transform defined by the calibration parameters of the camera with respect to other cameras in the camera rig system 130. After calibration, for example, the image processing system 100 may perform a transform 325 to account for calibration of the camera in the camera rig system 130. The transform may be determined by a "stretch" of the image by moving the location of control points for the corners of the image as discussed herein to align key points between images. Thus, in this example, after calibration the horizontal checkerboard lines of the stretched rectilinear image 330 are parallel to the horizontal outer edge 312. Though FIG. 3A shows correction of one rectilinear image as an example use case, the image processing system 100 may process any number of images simultaneously to correct distortions and manufacturing discrepancies. In addition, the results of such calibration do not necessarily adjust objects in the rendered images to align with an edge of the image frame. Rather, as discussed herein the calibration adjusts the camera calibration parameters to improve coherence of the camera images to combine images from the camera rig system 130. For example, the image processing system 100 may generate a rectified equirectangular projection 340, i.e., a canvas view that combines multiple rectilinear images 320 captured by peripheral cameras 230, where at least some of the rectilinear images 320 may be corrected to form stretched rectilinear images 330.

Figure 3B:
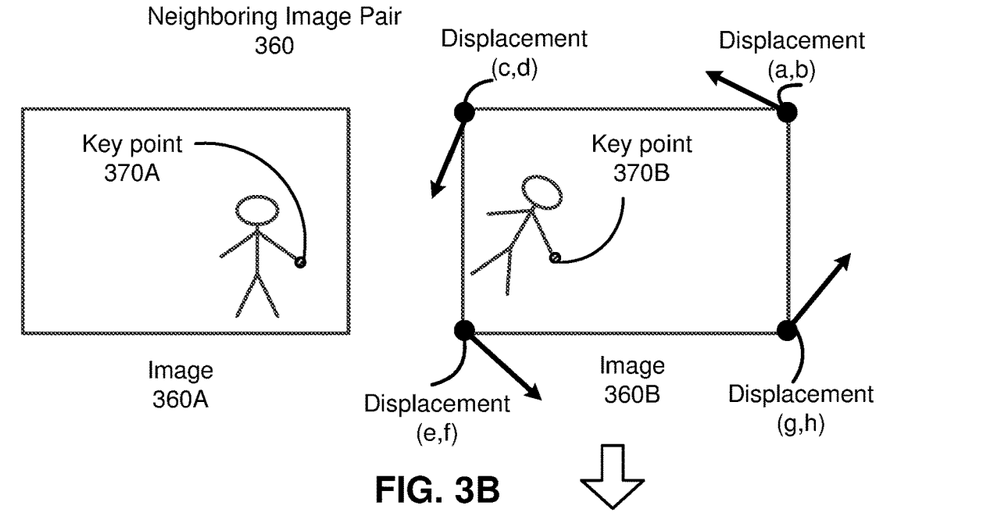
FIGS. 3B-3D show line diagrams of an example process of mitigating displacement error between a matching key point pair of a neighboring image pair, according to one embodiment.
Figure 3C:
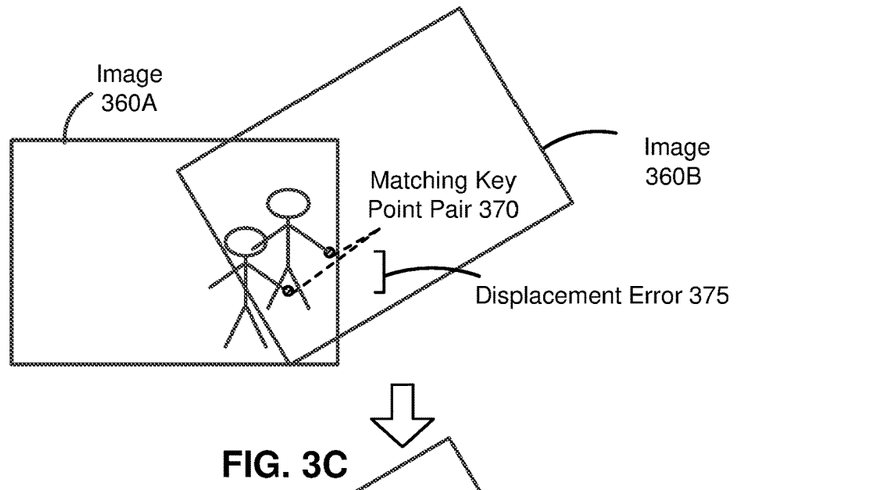
Figure 3D:
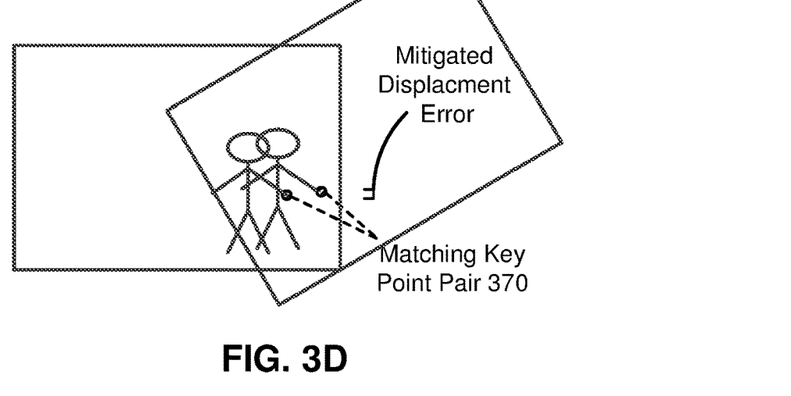

FIGS. 3B-3D show line diagrams of an example of mitigating displacement error 375 between a matching key point pair 370 of a neighboring image pair 360, according to one embodiment.

In FIG. 3B, a neighboring image pair 360 of image 360A and image 360B include key points 370A and 370B, respectively. The image processing system 100 generates the neighboring image pair 360 using images captured by two adjacent peripheral cameras. A matching key point pair includes key points representing a same (or similar) one or more features in multiple images. For example, the image processing system 100 analyzes the key point descriptors to determine that key points 370A and 370B represent a distal point on an arm of the human figure in the images 360A and 360B, respectively. Thus, the image processing system 100 identifies the matching key point pair 370 including key points 370A and 370B.

In the example shown in FIG. 3B, the human figures imaged by the neighboring image pair 360 are positioned at different orientations relative to each other. Displacements of the four corners in image 360B are represented as (a, b), (c, d), (e, f), (g, h). In one embodiment, the image processing system 100 adjusts image 360B by stretching the four corners in the counter-clockwise direction based on the displacements. The movement of these corner points may be used to determine a corresponding transform of the image 360B and represents calibration parameters for the camera that captured image 360B.

FIGS. 3B-3D illustrate one example of calibrating the camera rig system 130 by adjusting image 360B to align with image 360A. In alternative embodiments, the image processing system 400 may adjust both images of a neighboring image pair simultaneously, or adjust any number of neighboring image pairs simultaneously. Furthermore, in FIGS. 3B-3D, one matching key point pair 370 in a neighboring image pair 360 is illustrated, while in alternative embodiments multiple or different key point pairs may be identified and matched for a given neighboring image pair.

FIG. 3C shows an example of displacement error remaining between the matching key point pair 370 of the neighboring image pair 360. Though the image processing system 100 stretches the image 360B such that the human figures in the neighboring image pair 360 are positioned in the same orientation, there is displacement error 375 between the matching key point pair 370. The image processing system 100 mitigates the displacement error 375 by solving an optimization problem, as more fully described below in FIG. 4. FIG. 3D shows the neighboring image pair 360 with a mitigated (e.g., reduced) displacement error 375 between the matching key point pair 370. In one embodiment, to mitigate the displacement error 375, the image processing system 100 applies perspective transform matrices to the two adjacent cameras associated with the neighboring image pair 360. In some embodiments, the image processing system 100 eliminates the displacement error 375 such that a line intersecting the matching key point pair 370 is parallel to a horizontal reference line of the image 360A or 360, e.g., the top or bottom edge of one of the images.

Figure 4:
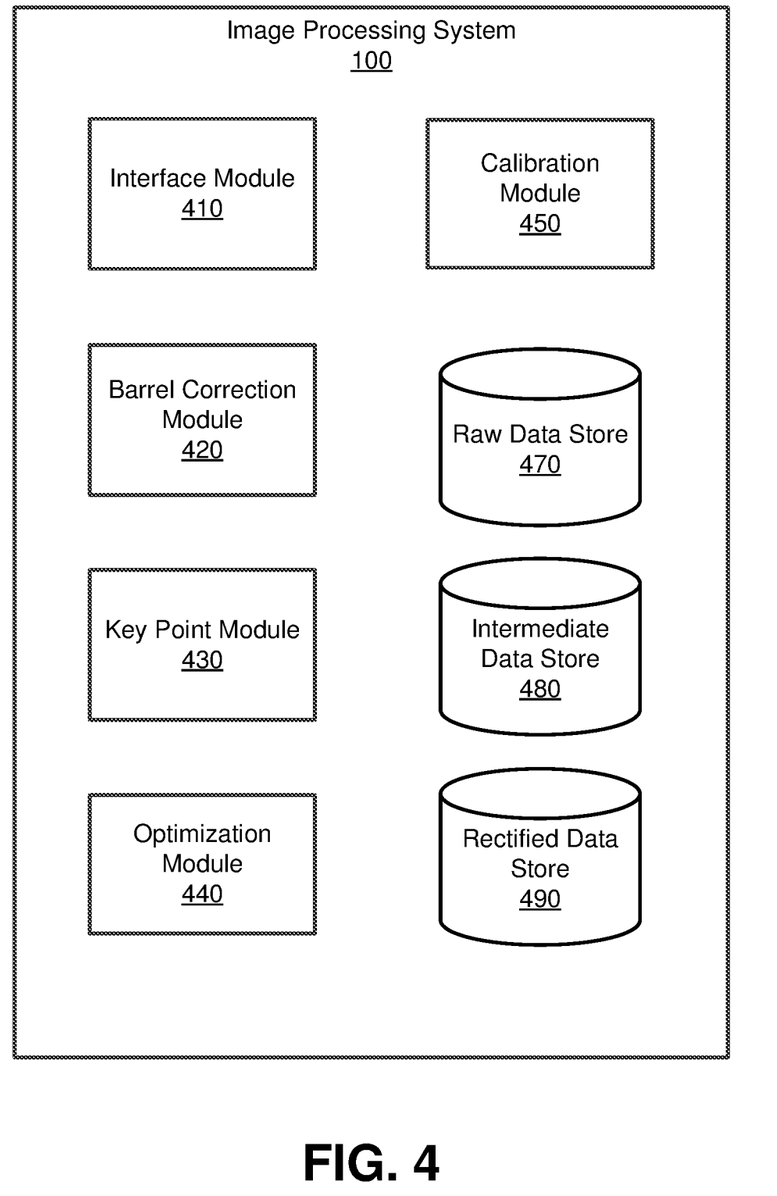
FIG. 4 is a block diagram of an architecture of the image processing system, according to one embodiment.

FIG. 4 is an example block diagram of an architecture of the image processing system 100, according to one embodiment. The image processing system 100 receives input from the camera rig system 130, such as media captured by the multiple cameras in the camera rig system 130. For example, the image processing system 100 receives images of a local scene captured by multiple peripheral cameras 230 of the camera rig system 130. The image processing system 100 may jointly rectify (e.g., calibrate) any number of the peripheral cameras 230 in the camera rig system 130 simultaneously or separately.

In more detail, in FIG. 4, the image processing system 100 includes an interface module 410, a barrel correction module 420, a key point module 430, an optimization module 440, a joint rectification module 450, a raw data store 470, an intermediate data store 480, and a rectified data store 490. In alternative embodiments, additional or different components may be included in the image processing system 100. Likewise, the functions performed by various entities of the image processing system 100 may differ in different embodiments.

The interface module 410 receives input data from the camera rig system 130 or from the client VR device 150. More specifically, the interface module 410 receives media from the camera rig system 130 and stores the media in the raw data store 470. For example, the interface module 410 can receive a set of 2D images of a local area or an object captured by the multiple peripheral cameras 230 in the camera rig system 130. The interface module 410 outputs data to the client VR device 150, for example, a generated 3D scene or canvas view to provide a virtual experience to a user wearing the client VR device 150.

The barrel correction module 420 corrects barrel distortion of captured images to generate rectilinear images, as previously described with reference to FIG. 3A. The barrel correction module 420 stores the rectilinear images in the intermediate data store 480.

The key point module 430 may match key points of neighboring rectilinear image pairs (or non-rectilinear image pairs). Referring to the example shown in FIGS. 3B-3D, the key point module 430 locates matching key point pair 370 in the neighboring image pair 360 to mitigate the displacement error 375 between the matching key point pairs 370. The key point module 430 may simultaneously identify and match key points in any number neighboring image pairs.

The optimization module 440 may generate a parameter vector to jointly rectify multiple cameras at the same time. In addition, the optimization module 440 converts the parameter vector to a set of perspective transforms that are applied to the set of the rectilinear images associated with the corresponding peripheral cameras 230. In one embodiment, the optimization module 440 generates the parameter vector by solving an optimization problem to reduce or minimize differences in a given dimension (e.g., the y-coordinates for vertical displacement error) of matching key points associated with corresponding neighboring rectilinear image pairs.

As one example, the optimization module 440 denotes a set of N rectilinear images that are each associated with a corresponding peripheral camera 230 as Image-1, Image-2, . . . , Image-N. Image-i (i=1, 2, . . . , N) is an arbitrary rectilinear image captured by a corresponding peripheral camera 230. For instance, N=14 for the camera rig system 130 shown in FIGS. 2A-2B that includes fourteen peripheral cameras 230. $(x, y)^i_j$ (j=1, 2, . . . M), as used herein, represents two-dimension coordinate for a key point indexed with j shown in the Image-i. In one embodiment, for each neighboring rectilinear image pair, M has the same value, which means the neighboring image pairs share a same number of key point pairs. In another embodiment, neighboring rectilinear image pairs may have different M values due to differences in the captured scenes or objects. As used herein, $\rho(x, y)^i_j$ represents 2D coordinate in the equirectangular projection of the coordinate $(x, y)^i_j$. $\rho(x, y)^i_j$ represents a key point in the equirectangular projection while $(x, y)^i_j$ represents a key point the rectilinear image, Image-i. The optimization module 440 identifies a key point indexed with j as Point-j, identifies Image-i and Image-i' as a neighboring image pair, and identifies Point-j and Point-j' (a matching key point pair) as key points in Image-i and Image-i', respectively. To reduce a displacement error between the matching key point pair, the optimization module 440 may solve the following optimization problem:

$$\min \sum_{i,i',j,j'} \left[ (\rho(x,y)^i_j[y] - \rho(x,y)^{i'}_{j'}[y])^2 \right] + \lambda |\vec{\theta}|_L$$

In one example, $(\rho(x,y)^i_j[y] - \rho(x,y)^{i'}_{j'}[y])$ represents the difference in y-coordinates of the matching key points Point-j and Point-j' in the neighboring rectilinear image pair, Image-i and Image-i'.

To solve the optimization problem, the optimization module 440 executes a gradient descent loop to generate a parameter vector $\vec{\theta}$, in some embodiments. The optimization module 440 applies the parameter vector $\vec{\theta}$ to a set of perspective transforms for jointly rectifying the peripheral cameras 230 in the camera rig system 130. In other words, the optimization module 440 may use the parameter vector $\vec{\theta}$ to adjust at least one transformation of the images to reduce a displacement error of the identified key points. The parameter vector $\vec{\theta}$ may contain 8N variables and be represented as:

$$\vec{\theta} = (a_1, b_1, c_1, d_1, e_1, f_1, g_1, h_1, \ldots, a_i, b_i, c_i, d_i, e_i, f_i, g_i, h_i, \ldots, a_N, b_N, c_N, d_N, e_N, f_N, g_N, h_N)$$

As previously described in FIG. 3B, a given rectilinear image has four corners labeled with (a, b), (c, d), (e, f), and (g, h), representing displacements from each of the corners, for a total of 8 variables (a, b, c, d, e, f, g, h), such that $\vec{\theta}$ is the zero vector when no transform is being applied (e.g., the corners stay in place). Thus, for a camera rig system 130 with a number of N peripheral cameras, a number of N rectilinear images may each have 8N variables in total, and the parameter vector $|\theta|$ includes the 8N variables.

In one embodiment, to execute the gradient descent loop, the optimization module 440 determines an initial parameter vector $\vec{\theta}_0$ and updates the parameter vector $\vec{\theta}$ at the end of each round of the gradient descent loop for a given number of rounds. As one example, The initial parameter vector $\vec{\theta}_0$ can be set as a zero vector, $\vec{\theta}_0 = (0, 0, 0, \ldots, 0)$. During each round of the gradient descent loop, the optimization module 440 determines, for each rectilinear image of the set of N rectilinear images, a perspective transform matrix from the corresponding four corners associated with the rectilinear image. As one example, a homogeneous transformation matrix is used as the perspective transform matrix to transform x and y coordinates of images 2D. As another example, the homogeneous transformation matrix is a 3-by-3 matrix that can be multiplied with a raw 3D coordinate to generate a transformed 3D coordinate. In the example shown in FIGS. 3A-3D, the value of z-coordinate in the raw or transformed 3D coordinate can be set as "1". The optimization module 440 may use the homogeneous transformation matrix to perform transformations (e.g., skew, scale, translations, rotations, or any combination thereof) on rectilinear images, e.g., a "stretch" transformation based on the eight variables associated with four corners in the image, as shown in FIGS. 3C-3D. The optimization module 440 may determine a homogeneous transformation matrix for a given rectilinear image based on the variables, e.g., (a, b, c, d, e, f, g, h), associated with the given rectilinear image. The optimization module 440 may apply the determined homogeneous transformation matrix to any number of identified key points of the given rectilinear image. The optimization module 440 executes a similar process for the other rectilinear images in the set. Additionally, the optimization module 440 may determine an aggregate displacement error (e.g., vertical displacement error in the y-dimension) of matching key point pairs of the neighboring rectilinear image pairs in the equirectangular projection. Namely, as described above, the optimization module 440 measures the value of the following function:

$$\sum_{i,i',j,j'} \left[ (\rho(x,y)^i_j[y] - \rho(x,y)^{i'}_{j'}[y])^2 \right]$$

The optimization module 440 adds a regularized parameter vector $|\vec{\theta}|_L$ so that the optimization module 440 may favor solutions with smaller adjustments, i.e., rotating a camera fewer degrees or translating the camera a shorter distance. The optimization module 440 computes the following gradient with finite differences:

$$\nabla f(\theta) = \nabla \sum_{i,i',j,j'} \left[ (\rho(x,y)^i_j[y] - \rho(x,y)^{i'}_{j'}[y])^2 \right] + \lambda |\vec{\theta}|_L$$

With the computed gradient $\nabla f(\theta)$, the optimization module 440 updates the parameter vector $\vec{\theta}$ for a round of the gradient descent loop based on the following:

$$\vec{\theta}_{t+1} = \vec{\theta}_t - \alpha \nabla f(\vec{\theta}_t)$$

In the above function, the current round of the gradient descent loop is indexed with label t, and the next round of the gradient descent loop is indexed with label t+1. $\vec{\theta}_t$ is the parameter vector $\vec{\theta}$ in the current round without updating, and $\vec{\theta}_{t+1}$ is the parameter vector $\vec{\theta}$ that is updated for the next round. With the updated parameter vector $\vec{\theta}_{t+1}$, the optimization module 440 executes the next round in the gradient descent loop in a similar iterative process.

In one embodiment, the optimization module 440 stops the gradient descent loop and obtains a final parameter vector $\vec{\theta}$ responsive to determining that a particular criteria is satisfied. Example criteria may include reducing the aggregate displacement error under a threshold error, or iterating for a certain number of rounds in the gradient decent loop (e.g., a time-out). In some embodiments, the optimized parameter vector $\vec{\theta}$ contains optimized values, i.e., to minimize the aggregate displacement error based on the 8N variables in the vector for the set of perspective transform matrixes. The optimization module 440 may store parameter vectors of the gradient descent loop in the intermediate data store 480.

The calibration module 450 applies the final parameter vector $\vec{\theta}$ to simultaneously calibrate multiple peripheral cameras 230 in the camera rig system 130. The calibration module 450 may convert the final parameter vector $\vec{\theta}$ to a set of perspective transform matrices associated with the set of rectilinear images. Further, the calibration module 450 may simultaneously apply the set of perspective transform matrices to adjust transformations of the corresponding rectilinear images such that the aggregate displacement error is reduced or minimized in an equirectangular projection. Thus, the calibration module 450 mitigates alignment errors between matching key point pairs for equirectangular projections generated by the image processing system 100. The calibration module 450 may store the rectified neighboring image pairs and equirectangular projections in the rectified data store 490.

Figure 5:
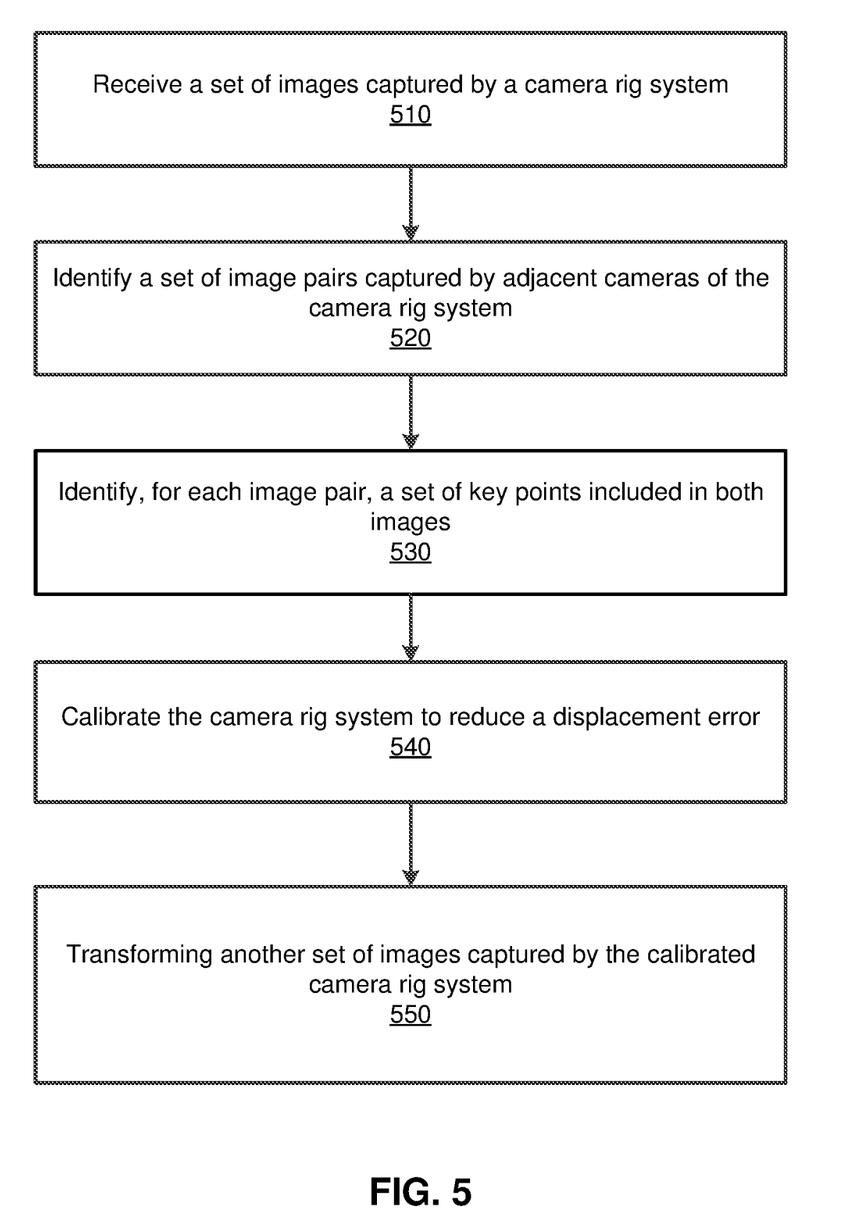
FIG. 5 shows a flowchart illustrating a process of calibrating the camera rig system, according to one embodiment.

FIG. 5 shows a flowchart illustrating a process of calibrating the camera rig system 130, according to one embodiment. The interface module 410 receives 510 a set of images each captured by a different camera in the camera rig system 130. Each of the cameras may be adjacent to at least two other cameras in the camera rig system. The key point module 430 identifies 520 a set of image pairs, where each image pair includes images of the set of rectilinear images captured by adjacent cameras of the camera rig system 130. The key point module 430 identifies 530, for each image pair, a set of key points included in both images of the image pair. The calibration module 450 calibrates 540 the camera rig system 130 by adjusting at least one transformation (e.g., stretch, scale, translation, or rotation) of the set of images to reduce a displacement error of the identified sets of key points in a dimension. The calibration module 450 transforms 550 another set of images each captured by the different cameras in the calibrated camera rig system 130.

Figure 6:
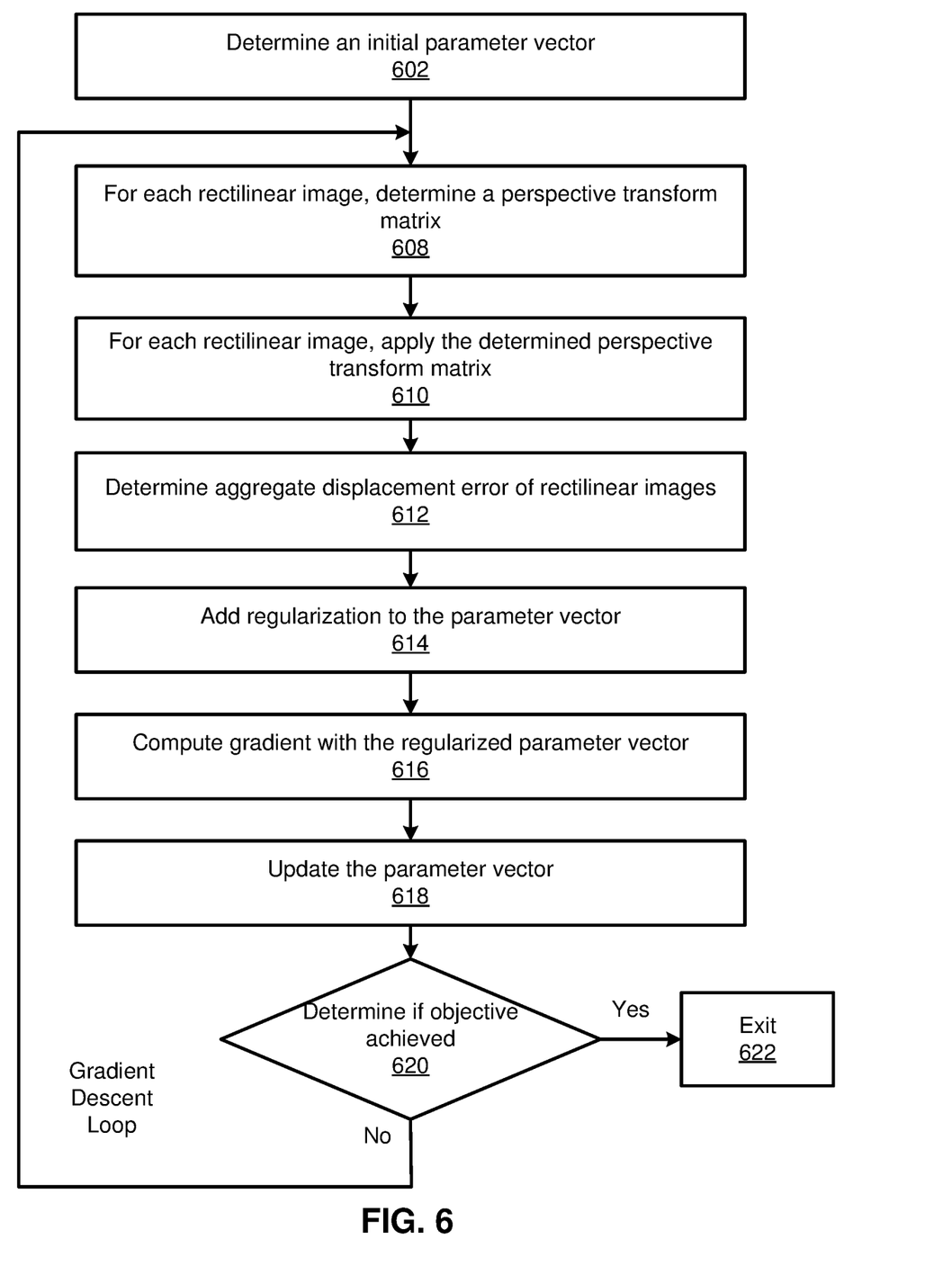
FIG. 6 shows a flowchart illustrating a process of solving an optimization problem, according to one embodiment.

FIG. 6 shows a flowchart illustrating a process of solving an optimization problem, according to one embodiment. The image processing system 100 may use the process shown in FIG. 6 to perform the calibration 540 step in FIG. 5. The optimization module 440 determines 602 an initial parameter vector to start a gradient descent loop to calibrate a set of rectilinear images (e.g., received in the step 510 shown in FIG. 5). The optimization module 440 determines 608 for each rectilinear image, a perspective transform matrix from based on the four corners of the rectilinear image. The optimization module 440 applies 610, for each rectilinear image, the determined perspective transform matrix to each identified key point of the rectilinear image (based on the identification 530 step shown in FIG. 5). The optimization module 440 determines 612 the aggregate displacement error of the rectilinear image, e.g., indicating an aggregate level of misalignment of key points included in pairs of the rectilinear images in a dimension. The optimization module 440 adds 614 regularization to the parameter vector to generate a regularized parameter vector. The optimization module 440 computes 616 a gradient with the regularized parameter vector. Using the computed gradient, the optimization module 440 updates 618 the parameter vector.

The optimization module 440 determines 620 if an objective is achieved, e.g., whether an aggregate displacement error of key points in the rectilinear images is less than a threshold error. Responsive to determining that the objective is achieved, optimization module 440 exits 622 the gradient descent loop. Responsive to determining that the objective is not achieved (e.g., the aggregate displacement error has not been reduced below the threshold error), the optimization module 440 may repeat steps 608-620. In some embodiments, a calibration process is completed when the objective is achieved and a final parameter vector is obtained. Accordingly, the image processing system 100 may perform step 550 shown in FIG. 5 to transform the other set of images captured by the calibrated camera rig system 130.

Additional Configuration Information

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for calibrating a camera rig system, the method comprising:
receiving a plurality of rectilinear images each captured by a different camera in the camera rig system, each camera adjacent to at least two other cameras in the camera rig system;
identifying a first image pair of the plurality of rectilinear images captured by a pair of adjacent cameras of the camera rig system, the first image pair including a first rectilinear image and a second rectilinear image;
identifying a set of key points indicating a common feature in the first rectilinear image and the second rectilinear image;
determining a vector including coordinate points of corners of at least the second rectilinear image;
determining, using the vector to represent displacement of the second rectilinear image relative to the first rectilinear image, a transformation of the second rectilinear image that reduces a displacement error between the identified set of key points in a dimension;
receiving a second image pair of rectilinear images captured by the pair of adjacent cameras of the camera rig system; and
applying the transformation to the second image pair.

2. The method of claim 1, wherein cameras of the camera rig system are circumferentially arranged such that each camera has a field of view that overlaps with fields of view of corresponding adjacent cameras.

3. The method of claim 1, further comprising:
correcting barrel distortion of raw images captured by cameras of the camera rig system to generate the plurality of rectilinear images.

4. The method of claim 1, further comprising:
transforming another set of rectilinear images each captured by the different cameras in the camera rig system; and
generating a panoramic view by combining the transformed set of rectilinear images, the panoramic view having at least a 180 degree field of view of a scene captured by cameras of the camera rig system.

5. The method of claim 1, further comprising:
applying the transformation to a third image pair simultaneously with applying the transformation to the second image pair.

6. The method of claim 1, wherein reducing the displacement error reduces a vertical error between the identified set of key points in the dimension.

7. The method of claim 6, wherein reducing the displacement error eliminates the vertical error such that a line intersecting the identified set of key points is parallel to a horizontal reference line of the first or second rectilinear image.

8. The method of claim 1, wherein
the vector is determined using a gradient descent loop, the method further comprising:
generating a perspective transform matrix based on the vector.

9. The method of claim 8, wherein applying the transformation comprises performing a translation or rotation to the second image pair.

10. A non-transitory computer-readable storage medium storing instructions that when executed by a processor cause the processor to:
receive a plurality of rectilinear images each captured by a different camera in the camera rig system, each camera adjacent to at least two other cameras in the camera rig system;
identify a first image pair of the plurality of rectilinear images captured by a pair of adjacent cameras of the camera rig system, the first image pair including a first rectilinear image and a second rectilinear image;
identify a set of key points indicating a common feature in the first rectilinear image and the second rectilinear image;
determine a vector including coordinate points of corners of at least the second rectilinear image;
determine, using the vector to represent displacement of the second rectilinear image relative to the first rectilinear image, a transformation of the second rectilinear image that reduces a displacement error between the identified set of key points in a dimension;
receive a second image pair of rectilinear images captured by the pair of adjacent cameras of the camera rig system; and
apply the transformation to the second image pair.

11. The non-transitory computer-readable storage medium of claim 10, wherein cameras of the camera rig system are circumferentially arranged such that each camera has a field of view that overlaps with fields of view of corresponding adjacent cameras.

12. The non-transitory computer-readable storage medium of claim 10, storing further instructions that when executed by the processor cause the processor to:
correct barrel distortion of raw images captured by cameras of the camera rig system to generate the plurality of rectilinear images.

13. The non-transitory computer-readable storage medium of claim 10, storing further instructions that when executed by the processor cause the processor to:
transform another set of rectilinear images each captured by the different cameras in the camera rig system; and
generate a panoramic view by combining the transformed set of rectilinear images, the panoramic view having at least a 180 degree field of view of a scene captured by cameras of the camera rig system.

14. The non-transitory computer-readable storage medium of claim 10, storing further instructions that when executed by the processor cause the processor to:
apply the transformation to a third image pair simultaneously with applying the transformation to the second image pair.

15. The non-transitory computer-readable storage medium of claim 10, wherein reducing the displacement error reduces a vertical error between the identified set of key points in the dimension.

16. The non-transitory computer-readable storage medium of claim 15, wherein reducing the displacement error eliminates the vertical error such that a line intersecting the identified set of key points is parallel to a horizontal reference line of the first or second rectilinear image.

17. The non-transitory computer-readable storage medium of claim 10, wherein
the vector is determined using a gradient descent loop, the non-transitory computer-readable storage medium storing further instructions that when executed by the processor cause the processor to:
generate a perspective transform matrix based on the vector.

18. The non-transitory computer-readable storage medium of claim 17, wherein applying the transformation comprises performing a translation or rotation to the second image pair.

\* \* \* \* \*